(12) United States Patent
Lashmore et al.

(10) Patent No.: US 8,246,886 B2
(45) Date of Patent: Aug. 21, 2012

(54) CHEMICALLY-ASSISTED ALIGNMENT OF NANOTUBES WITHIN EXTENSIBLE STRUCTURES

(75) Inventors: David S. Lashmore, Lebanon, NH (US); Robert Braden, Pembroke, NH (US); Anastasios John Hart, Ann Arbor, MI (US); John Welch, Pembroke, NH (US)

(73) Assignee: Nanocomp Technologies, Inc., Concord, NH (US)

( * ) Notice: Subject to any disclaimer, the term of this patent is extended or adjusted under 35 U.S.C. 154(b) by 1066 days.

(21) Appl. No.: 12/170,092

(22) Filed: Jul. 9, 2008

(65) Prior Publication Data

US 2009/0075545 A1 Mar. 19, 2009

Related U.S. Application Data

(60) Provisional application No. 60/958,758, filed on Jul. 9, 2007.

(51) Int. Cl.
*B29C 55/00* (2006.01)
*B29C 47/00* (2006.01)

(52) U.S. Cl. .............. 264/289.6; 264/108; 264/172.11; 264/172.16; 264/172.17; 264/172.19; 264/173.1; 264/177.18; 264/181; 264/183; 264/184; 264/288.4; 264/288.8; 264/289.3; 264/208; 264/209.5; 264/210.3; 264/210.4; 264/211.13; 977/742; 977/750; 977/752; 977/842; 977/843; 977/844; 977/845; 977/846; 977/847; 977/848

(58) Field of Classification Search ............... None
See application file for complete search history.

(56) References Cited

U.S. PATENT DOCUMENTS

| 2,962,386 | A | 11/1960 | Doll et al. |
| 3,090,876 | A | 5/1963 | Hutson |
| 3,109,712 | A | 11/1963 | Redfern |
| 3,462,289 | A | 8/1969 | Rohl et al. |
| 3,693,851 | A | 9/1972 | Yazawa .............. 225/3 |
| 3,706,193 | A | 12/1972 | Amato .............. 57/58.89 |
| 3,943,689 | A | 3/1976 | Kunz et al. .............. 57/34 |
| 3,983,202 | A | 9/1976 | Skoroszewski .............. 264/147 |
| 4,384,944 | A | 5/1983 | Silver et al. .............. 204/159.13 |

(Continued)

FOREIGN PATENT DOCUMENTS
EP 1160861 A2 12/2001
(Continued)

OTHER PUBLICATIONS

Gou, J.G., "*Passage: Nanotube Bucky Papers and Nanocomposites*", Ph.D. Dissertation, Marburg An Der Lahn, pp. 93-126, Jan. 1, 2002.

(Continued)

*Primary Examiner* — Jeffrey Wollschlager
(74) *Attorney, Agent, or Firm* — Greenberg Traurig, LLP; Chinh H. Pham; Natalie Salem (57) ABSTRACT

A method and system for aligning nanotubes within an extensible structure such as a yarn or non-woven sheet. The method includes providing an extensible structure having non-aligned nanotubes, adding a chemical mixture to the extensible structure so as to wet the extensible structure, and stretching the extensible structure so as to substantially align the nanotubes within the extensible structure. The system can include opposing rollers around which an extensible structure may be wrapped, mechanisms to rotate the rollers independently or away from one another as they rotate to stretch the extensible structure, and a reservoir from which a chemical mixture may be dispensed to wet the extensible structure to help in the stretching process.

21 Claims, 3 Drawing Sheets

U.S. PATENT DOCUMENTS

| | | | |
|---|---|---|---|
| 4,468,922 A | 9/1984 | McCrady et al. | 57/402 |
| 4,572,813 A | 2/1986 | Arakawa | 264/29.2 |
| 4,987,274 A | 1/1991 | Miller et al. | 174/102 |
| 5,168,004 A | 12/1992 | Daumit et al. | 428/221 |
| 5,428,884 A | 7/1995 | Tsuzuki | 29/290 |
| 5,488,752 A | 2/1996 | Randolph | 15/250.06 |
| 5,648,027 A | 7/1997 | Tajiri et al. | |
| 6,036,774 A | 3/2000 | Lieber et al. | 117/105 |
| 6,110,590 A | 8/2000 | Zarkoob et al. | 428/364 |
| 6,143,412 A | 11/2000 | Schueller et al. | |
| 6,265,466 B1 | 7/2001 | Glatkowski et al. | 523/137 |
| 6,299,812 B1* | 10/2001 | Newman et al. | 264/176.1 |
| 6,308,509 B1 | 10/2001 | Scardino et al. | 57/402 |
| 6,331,265 B1 | 12/2001 | Dupire et al. | 264/289.3 |
| 6,333,016 B1 | 12/2001 | Resasco et al. | 423/447.3 |
| 6,376,971 B1 | 4/2002 | Pelrine et al. | |
| 6,452,085 B2 | 9/2002 | Tauchi et al. | |
| 6,495,116 B1 | 12/2002 | Herman | |
| 6,682,677 B2 | 1/2004 | Lobovsky et al. | 264/172.11 |
| 6,706,402 B2 | 3/2004 | Rueckes et al. | |
| 6,723,299 B1* | 4/2004 | Chen et al. | 423/447.1 |
| 6,790,426 B1 | 9/2004 | Ohsaki | |
| 6,842,328 B2 | 1/2005 | Schott et al. | |
| 7,001,556 B1* | 2/2006 | Shambaugh | 264/210.6 |
| 7,045,108 B2 | 5/2006 | Jiang et al. | |
| 7,048,999 B2 | 5/2006 | Smalley et al. | 428/367 |
| 7,052,668 B2 | 5/2006 | Smalley et al. | |
| 7,122,165 B2 | 10/2006 | Wong et al. | 423/447.2 |
| 7,182,929 B1 | 2/2007 | Singhal et al. | |
| 7,323,157 B2 | 1/2008 | Kinloch et al. | |
| 7,413,474 B2 | 8/2008 | Liu et al. | |
| 7,437,938 B2 | 10/2008 | Chakraborty | |
| 7,491,883 B2 | 2/2009 | Lee et al. | |
| 7,553,472 B2 | 6/2009 | Mouli et al. | |
| 7,704,480 B2* | 4/2010 | Jiang et al. | 423/447.2 |
| 7,727,504 B2 | 6/2010 | Kittrell et al. | |
| 7,750,240 B2 | 7/2010 | Jiang et al. | |
| 7,906,208 B2* | 3/2011 | Poulin et al. | 428/372 |
| 7,938,996 B2* | 5/2011 | Baughman et al. | 264/108 |
| 2001/0003576 A1 | 6/2001 | Klett et al. | 423/445 |
| 2002/0004028 A1 | 1/2002 | Margrave et al. | 423/447.3 |
| 2002/0040900 A1 | 4/2002 | Arx et al. | |
| 2002/0113335 A1 | 8/2002 | Lobovsky et al. | 264/184 |
| 2002/0130610 A1 | 9/2002 | Gimzewski et al. | |
| 2002/0136681 A1 | 9/2002 | Smalley et al. | 423/447.2 |
| 2002/0159943 A1 | 10/2002 | Smalley et al. | 423/447.1 |
| 2002/0179564 A1 | 12/2002 | Geobegan et al. | |
| 2003/0036877 A1 | 2/2003 | Schietinger | 702/134 |
| 2003/0109619 A1 | 6/2003 | Keller et al. | 524/440 |
| 2003/0133865 A1 | 7/2003 | Smalley et al. | |
| 2003/0134916 A1 | 7/2003 | Hrubesh | |
| 2003/0165648 A1 | 9/2003 | Lobovsky et al. | 428/36.9 |
| 2003/0222015 A1 | 12/2003 | Oyama et al. | 210/500.21 |
| 2004/0020681 A1 | 2/2004 | Hjortstam et al. | |
| 2004/0022981 A1 | 2/2004 | Hu et al. | 428/36.9 |
| 2004/0053780 A1 | 3/2004 | Jiang et al. | 502/182 |
| 2004/0081758 A1 | 4/2004 | Mauthner et al. | |
| 2004/0096389 A1 | 5/2004 | Lobovsky et al. | 423/447.1 |
| 2004/0124772 A1 | 7/2004 | Chen | |
| 2004/0150312 A1 | 8/2004 | McElrath et al. | |
| 2004/0177451 A1* | 9/2004 | Poulin et al. | 8/115.51 |
| 2004/0240144 A1 | 12/2004 | Schott et al. | |
| 2004/0265489 A1 | 12/2004 | Dubin | |
| 2004/0266065 A1 | 12/2004 | Zhang et al. | |
| 2005/0006801 A1* | 1/2005 | Kinloch et al. | 264/5 |
| 2005/0046017 A1 | 3/2005 | Dangelo | 257/720 |
| 2005/0063658 A1 | 3/2005 | Crowley | |
| 2005/0067406 A1 | 3/2005 | Rajarajan et al. | |
| 2005/0074569 A1 | 4/2005 | Lobovsky et al. | 428/36.9 |
| 2005/0087222 A1 | 4/2005 | Muller-Werth | |
| 2005/0104258 A1 | 5/2005 | Lennhoff | 264/465 |
| 2005/0170089 A1 | 8/2005 | Lashmore et al. | 427/248.1 |
| 2005/0179594 A1 | 8/2005 | Morikawa et al. | |
| 2005/0269726 A1 | 12/2005 | Matabayas, Jr. | |
| 2006/0118158 A1 | 6/2006 | Zhang et al. | |
| 2006/0252853 A1 | 11/2006 | Ajayan et al. | |
| 2006/0269670 A1 | 11/2006 | Lashmore et al. | 427/249.1 |
| 2006/0272701 A1 | 12/2006 | Ajayan et al. | |
| 2007/0031662 A1 | 2/2007 | Devaux et al. | 428/354 |
| 2007/0036709 A1* | 2/2007 | Lashmore et al. | 423/447.1 |
| 2007/0056855 A1 | 3/2007 | Lo et al. | |
| 2007/0092431 A1* | 4/2007 | Resasco et al. | 423/447.3 |
| 2007/0104947 A1 | 5/2007 | Shambaugh | 428/359 |
| 2007/0116627 A1 | 5/2007 | Collier et al. | |
| 2007/0116631 A1* | 5/2007 | Li et al. | 423/447.3 |
| 2007/0140947 A1 | 6/2007 | Schneider et al. | |
| 2007/0151744 A1 | 7/2007 | Chen | 174/110 |
| 2007/0166223 A1* | 7/2007 | Jiang et al. | 423/447.1 |
| 2007/0232699 A1 | 10/2007 | Russell et al. | |
| 2007/0293086 A1 | 12/2007 | Liu et al. | |
| 2008/0170982 A1* | 7/2008 | Zhang et al. | 423/447.3 |
| 2008/0238882 A1 | 10/2008 | Sivarajan et al. | |
| 2009/0042455 A1 | 2/2009 | Mann et al. | |
| 2009/0044848 A1 | 2/2009 | Lashmore et al. | |
| 2009/0047513 A1 | 2/2009 | Lashmore | |
| 2009/0117025 A1 | 5/2009 | Lashmore et al. | |
| 2009/0169819 A1 | 7/2009 | Drzaic et al. | |
| 2009/0194525 A1 | 8/2009 | Lee et al. | |
| 2009/0237886 A1 | 9/2009 | Iwai et al. | |
| 2009/0269511 A1 | 10/2009 | Zhamu et al. | |
| 2009/0277897 A1 | 11/2009 | Lashmore et al. | |
| 2010/0041297 A1 | 2/2010 | Jiang et al. | |
| 2010/0219383 A1 | 9/2010 | Eklund | |
| 2010/0220074 A1 | 9/2010 | Irvin, Jr. et al. | |
| 2010/0324656 A1 | 12/2010 | Lashmore et al. | |
| 2010/0328845 A1 | 12/2010 | Hiralal et al. | |
| 2011/0005808 A1 | 1/2011 | White et al. | |

FOREIGN PATENT DOCUMENTS

| | | |
|---|---|---|
| JP | 2004-315297 | 11/2004 |
| JP | 2005/281672 | 10/2005 |
| JP | 2002-515847 | 5/2008 |
| JP | 2011-508364 | 3/2011 |
| WO | WO 98/39250 | 9/1998 |
| WO | WO 2006/073460 | 7/2006 |
| WO | WO 2008/036068 | 3/2008 |
| WO | WO 2008/048286 | 4/2008 |
| WO | WO 2011/005964 | 1/2011 |

OTHER PUBLICATIONS

Hanson, G.W., "Fundamental Transmitting Properties of Carbon Nanotube Antennas", IEEE Transactions on Antennas and Propagation, vol. 53, No. 11, pp. 3426-3435, Nov. 2005.

Merriam Webster Dictionary definition of "along", available at http://merriam-webster.com/dictionary/along (retrieved Sep. 16, 2010).

"Metallurgical & Chemical Engineering", McGraw Publishing Co., vol. 15, No. 5, pp. 258-259, Dec. 15, 1916.

Schaevitz et al., "A Combustion-Based Mems Thermoelectric Power Generator", The 11th Conference on Solid-State Sensors and Actuators, Munich, Germany, Jun. 10-14, 2001.

Xiao et al., "High-Mobility Thin-Film Transistors Based on Aligned Carbon Nanotubes", Applied Physics Letters, vol. 83, No. 1, pp. 150-152, Jul. 7, 2003.

Office Action cited in U.S. Appl. No. 11/413,512 mailed Jul. 8, 2010.

Office Action cited in U.S. Appl. No. 11/415,927 mailed Feb. 22, 2010.

Office Action cited in U.S. Appl. No. 11/415,927 mailed Sep. 9, 2010.

Office Action cited in U.S. Appl. No. 11/715,756 mailed Jan. 25, 2010.

Office Action cited in U.S. Appl. No. 11/818,279 mailed Jun. 2, 2010.

Office Action cited in U.S. Appl. No. 12/187,278 mailed Jun. 11, 2010.

Office Action cited in U.S. Appl. No. 12/191,765 mailed May 14, 2010.

Office Action cited in U.S. Appl. No. 12/390,906 mailed Jul. 9, 2010.

International Search Report based on PCT/US2009/043209 dated Mar. 3, 2010.

International Search Report based on PCT/US2010/041374 dated Sep. 8, 2010.

European Search Report based on EP 06849762.7 dated Jan. 14, 2010.

Australian Examiner's Report cited in AU Serial No. 2006249601 dated Jun. 24, 2010.

Australian Examiner's Report cited in AU Serial No. 2006350110 dated Feb. 9, 2010.

Moisala et al., "Single-walled carbon nanotube synthesis using ferrocene and iron pentacarbonyl in a laminar flow reactor," *Chemical Engineering Science*, 61(13), pp. 4393-4402 (Jul. 2006).

Official Action cited in JP Serial No. 2008-540155 dated Mar. 8, 2011.

Final Office Action in U.S. Appl. No. 12/140,263 mailed Mar. 9, 2011.

Non-Final Office Action in U.S. Appl. No. 11/415,927 mailed Mar. 10, 2011.

Non-Final Office Action in U.S. Appl. No. 12/180,300 mailed Mar. 16, 2011.

Non-Final Office Action in U.S. Appl. No. 12/191,765 mailed Apr. 4, 2011.

Non-Final Office Action in U.S. Appl. No. 12/566,229 mailed Apr. 6, 2011.

Supplementary European Search Report based on EP 08797307 dated Mar. 29, 2011.

Supplementary European Search Report based on EP 06851749 dated Apr. 1, 2011.

Non-Final Office Action in U.S. Appl. No. 12/841,768 mailed May 26, 2011.

R.T.K. Baker et al., "*Nucleation and Growth of Carbon Deposits from the Nickel Catalyzed Decomposition of Acetylene*", Journal of Catalysis, 26:51-62 (1972).

H.W. Kroto et al., "*C60: Buckminsterfullerene*", Letters to Nature, 318:162-163, (1985).

Sumio Iijima, "*Helical microtubules of graphitic carbon*", Letters to Nature, 354:56-58, (1991).

D.S. Bethune et al., *Cobalt-catalyzed growth of carbon nanotubes with single-atomic-layer walls*, Letters to Nature, 363:605-607 (1993).

M. Jose-Yacaman et al., "*Catalytic growth of carbon microtubules with fullerene structure*", Applied Physics Letters, 62(6):657-659 (1993).

Gun-Do Lee et al, "*Catalytic decomposition of acetylene on Fe(001): A first-principles study*", The American Physical Society, Physical Review B66 081403R:1-4 (2002).

N. Seo Kim et al., "*Dependence of the Vertically Aligned Growth of Carbon Nanotubes on the Catalysts*", The Journal of Physical Chemistry, 106(36):9286-9290 (2002).

H. W. Zhu et al., "*Direct Synthesis of Long Single-Walled Carbon Nanotube Strands*", Science, 296:884-886 (2002).

Ki-Hong Lee et al., "*Control of growth orientation for carbon nanotubes*", Applied Physics Letters, 82(3): 448-450, (2003).

E. F. Kukovitsky et al., "*CVD growth of carbon nanotube films on nickel substrates*", Applied Surface Science, 215:201-208 (2003).

Gou, J.G., "*Single-Walled Carbon Nanotube Bucky Paper/Epoxy Composites: Molecular Dynamics Simulation and Process Development*", PhD dissertation, The Florida State University, 2002, p. 9-126.

Li, et al. "*Direct Spinning of Carbon Nanotube Fibers from Chemical Vapor Deposition Synthesis*", Science Magazine, 2004, vol. 304, pp. 276-278.

Surfynol, Dynol, and Envirogem Reference Guide. AirProducts, 2006 [retrieved from the Internet: <URL: www.airproducts.com/microsite/perfmat/pdf/ZetaSperseAdditives.pdf>.

PCT International Search Report based on PCT/US08/69517, dated Apr. 14, 2009.

Okabe, T. et al., *New Porous Carbon Materials, Woodceramics: Development and Fundamental Properties*, Journal of Porous Materials, vol. 2, pp. 207-213, 1996.

Seung-Yup Lee et al., *Synthesis of Carbon Nanotubes Over Gold Nanoparticle Supported Catalysts*, Carbon, 43 (2005), pp. 2654-2663.

Biro, et al., "Direct Synthesis of Multi-Walled and Single-Walled Carbon Nanotubes by Spray-Pyrolysis", J. Optoelectronics and Advanced Materials, Sep. 2003; vol. 5, No. 3, pp. 661-666.

Kaili, et al., "Spinning Continuous Carbon Nanotube Yarns", Nature, Oct. 24, 2002, vol. 419, p. 801.

Li, et al., "Direct Spinning of Carbon Nanotube Fibers from Chemical Vapor Deposition Synthesis", Apr. 9, 2004, vol. 304, pp. 276-278.

Tapaszto, et al., "Diameter and Morphology Dependence on Experimental Conditions of Carbon Nanotube Arrays Grown by Spray Pyrolysis", Carbon, Jan. 2005; vol. 43, pp. 970-977.

Non-Final Office Action in U.S. Appl. No. 12/140,263 mailed Sep. 20, 2010.

Non-Final Office Action in U.S. Appl. No. 12/187,278 mailed Sep. 29, 2010.

Non-Final Office Action in U.S. Appl. No. 12/038,408 mailed Oct. 14, 2010.

Non-Final Office Action in U.S. Appl. No. 12/437,537 mailed Oct. 25, 2010.

Final Office Action in U.S. Appl. No. 12/191,765 mailed Oct. 28, 2010.

Supplementary European Search Report based on EP 06851553.5 dated Nov. 15, 2010.

International Search Report for International Patent Application No. PCT/US2012/020194 mailed May 1, 2012.

* cited by examiner

CHEMICALLY-ASSISTED ALIGNMENT OF NANOTUBES WITHIN EXTENSIBLE STRUCTURES

RELATED U.S. APPLICATION(S)

The present invention claims priority to U.S. Provisional Application Ser. No. 60/958,758, filed Jul. 9, 2007, which application is hereby incorporated herein by reference.

GOVERNMENT SUPPORT

The invention was supported, in whole or in part, by Contract No. W911-QY-06-C-0026 from the U.S. Army Soldier Systems Center (Natick, MA). The Government may have certain rights in the invention.

TECHNICAL FIELD

The present invention relates to methods for alignment of nanotubes, and more particularly, to methods of substantially aligning nanotubes within extensible structures, such as yarns or non-woven sheets made from nanotubes.

BACKGROUND ART

Nanotubes may be fabricated using a variety of approaches. For example, nanotubes can be produced by conducting chemical vapor deposition (CVD) in such a manner that the nanotubes can be caused to deposit either on a moving belt or cylinder, where the nanotubes consolidate so as to form a non-woven sheet. Alternatively, the nanotubes can be taken up by a spinning device and spun into a yarn. Nanotubes collected as yarns, non-woven sheets, or similar extensible structures can also be fabricated by other means. For instance, the nanotubes can be dispersed in a water surfactant solution, then caused to precipitate onto a filter drum or membrane, where they can be subsequently be dried and removed as a sort of paper. Similarly, nanotubes collected as yarns can also be produced from solutions, and is well known in the art. In general, the nanotubes produced within these extensible structures can be either single-walled (SWNT) or multi-walled (MWNT), and may be made from, for example, carbon, boron, or a combination thereof.

Due to the random nature of the growth and fabrication process, as well as the collection process, the texture, along with the position of the nanotubes relative to adjacent nanotubes within the extensible structure may also be random. In other words, the nanotubes within these extensible structures may not be well aligned, particularly for the non-woven sheets.

Since there are certain physical and mechanical properties that are dependent on alignment, the random nature of the nanotubes within these extensible structures can affect the properties of these extensible structures. The properties that may be affected include tensile strength and modulus, electrical conductivity, thermal conductivity, Seebeck coefficient, Peltier coefficient, and density. Other properties which may be affected, include the complex index of refraction, the frequency dependency of resistivity, and chemical reactivity.

To address the nanotube alignment issue prior to the formation of the extensible structure can be cumbersome, expensive, and cost prohibitive in connection with the fabrication process.

Accordingly, it would be desirable to provide a process which can enhance nanotube alignment within an extensible structure, while being economical, subsequent to the formation of the extensible structure.

SUMMARY OF THE INVENTION

The present invention provides, in one embodiment, a method for substantially aligning nanotubes within an extensible structure. The method includes adding a chemical to the extensible structure having non-aligned nanotubes, so as to wet the extensible structure. Next, the extensible structure may be stretched to substantially align the nanotubes within the extensible structure relative to one another. The stretched extensible structure may also exhibit enhanced contacts between adjacent nanotubes, which can result in increased electrical and thermal conductivity, as well as tensile strength. In an embodiment, the amount of stretch can be from about 5 percent to several times the original length of the extensible structure. Thereafter, the stretched structure may be washed and/or exposed to heat in order to remove any residue. In one embodiment, the step of washing may be accomplished using a thermal treatment, a chemical treatment, a electrochemical treatment, or a combination thereof.

The present invention also provides, in an embodiment, a system for substantially aligning nanotubes within an extensible structure. The system includes a pinch roller stretching apparatus having, among other things, gears which can create a difference in roller velocities, so as to stretch the nanotubes into alignment within the extensible structure. In one embodiment, stepper motors may be used in place of gears to generate a difference in roller velocities. The system may include a mechanism for wetting the extensible structure to help in the stretching process.

The present invention further provides a system for substantially aligning nanotubes within an extensible non-woven sheet. The system, in one embodiment, includes opposing rollers, around which the non-woven sheet may be wrapped. The opposing rollers may be designed to rotate, while one or both translate (i.e., move away from the other). The system may include a mechanism such as a reservoir for wetting the extensible non-woven sheet to help in the stretching process.

DESCRIPTION OF SPECIFIC EMBODIMENTS

Nanotubes for use in connection with the present invention may be fabricated using a variety of approaches. Presently, there exist multiple processes and variations thereof for growing nanotubes. These include: (1) Chemical Vapor Deposition (CVD), a common process that can occur at near ambient or at high pressures, and at temperatures above about 400° C., (2) Arc Discharge, a high temperature process that can give rise to tubes having a high degree of perfection, and (3) Laser ablation. It should be noted that although reference is made below to nanotube synthesized from carbon, other compound(s) may be used in connection with the synthesis of nanotubes for use with the present invention. Other methods, such as plasma CVD or the like are also possible. In addition, it is understood that boron nanotubes may also be grown in a similar environment, but with different chemical precursors.

The present invention, in one embodiment, employs a CVD process or similar gas phase pyrolysis procedures known in the industry to generate the appropriate nanostructures, including nanotubes. In particular, since growth temperatures for CVD can be comparatively low ranging, for instance, from about 400° C. to about 1300° C., carbon nanotubes, both single wall (SWNT) or multiwall (MWNT), may be grown, in an embodiment, from nanostructural catalyst particles introduced into reagent carbon-containing gases (i.e., gaseous carbon source), either by addition of existing particles or by in situ synthesis of the particles from a metal-organic precursor, or even non-metallic catalysts. Although both SWNT and MWNT may be grown, in certain instances, SWNT may be preferred due to their relatively higher growth rate and tendency to form ropes, which may offer advantages in handling, safety, and strength.

Moreover, the strength of the individual SWNT and MWNT generated for use in connection with the present invention may be about 30 GPa or more. Strength, as should be noted, is sensitive to defects. However, the elastic modulus of the SWNT and MWNT fabricated for use with the present invention is typically not sensitive to defects and can vary from about 1 to about 1.2 TPa. Moreover, the strain to failure, which generally can be a structure sensitive parameter, may range from a few percent to a maximum of about 12% in the present invention.

Furthermore, the nanotubes of the present invention can be provided with relatively small diameter, so that relatively high capacitance can be generated. In an embodiment of the present invention, the nanotubes of the present invention can be provided with a diameter in a range of from less than 1 nm to about 10 nm. It should be appreciated that the smaller the diameter of the nanotubes, the higher the surface area per gram of nanotubes can be provided, and thus the higher the capacitance that can be generated. For example, assuming a 50 micron Farads per cm capacitance for graphene and a density of about 1.5 g/cc for the SWNT, capacitance can be calculated using the following formula:

Capacitance (Farads/gram)=1333/d (nm)

Therefore, assuming a uniform textile of 1 nm diameter tubes with no shielding, then a specific capacitance of 1333 Farads per gram should be feasible, neglecting the loss in surface area when ropes are formed and neglecting the loss of active area for the nanotubes that may be shielded by neighboring nanotubes.

Figure 1A:
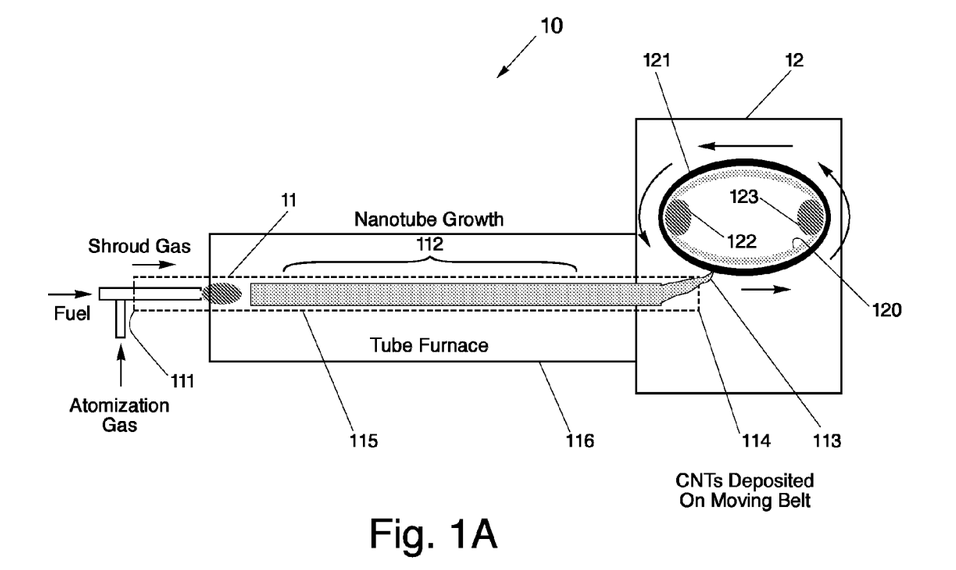
FIG. 1A illustrates a system for generating nanotubes and collecting the nanotubes as a non-woven sheet.

With reference now to FIG. 1A, there is illustrated a system 10, similar to that disclosed in U.S. patent application Ser. No. 11/488,387 (incorporated herein by reference), for use in the fabrication of nanotubes. System 10, in an embodiment, may be coupled to a synthesis chamber 11. The synthesis chamber 11, in general, includes an entrance end 111, into which reaction gases may be supplied, a hot zone 112, where synthesis of extended length nanotubes 113 may occur, and an exit end 114 from which the products of the reaction, namely the nanotubes and exhaust gases, may exit and be collected. The nanotubes generated, in an embodiment, may be individual nanotubes, bundles of nanotubes and/or intertwined nanotubes (e.g., ropes of nanotubes). In addition, synthesis chamber 11 may include, in an embodiment, a quartz tube 115 extending through a furnace 116.

System 10, in one embodiment of the present invention, may also includes a housing 12 designed to be substantially airtight, so as to minimize the release of potentially hazardous airborne particulates from within the synthesis chamber 11 into the environment. The housing 12 may also act to prevent oxygen from entering into the system 10 and reaching the synthesis chamber 11. In particular, the presence of oxygen within the synthesis chamber 11 can affect the integrity and compromise the production of the nanotubes 113.

Figure 1B:
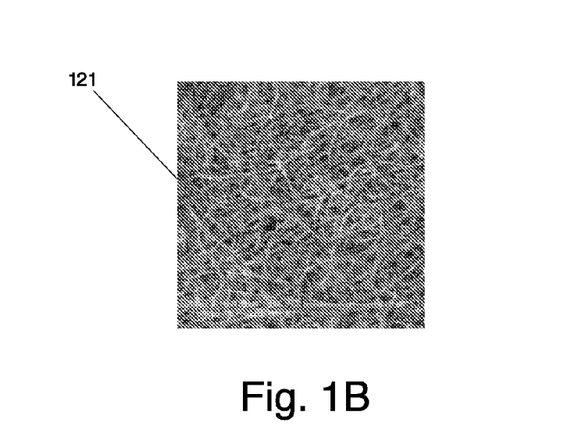
FIG. 1B illustrates a portion of an a non-woven sheet prior to being stretched with the nanotubes intermingled and substantially in non-alignment relative to one another.

System 10 may also include a moving belt 120, positioned within housing 12, designed for collecting synthesized nanotubes 113 made from a CVD process within synthesis chamber 11 of system 10. In particular, belt 120 may be used to permit nanotubes collected thereon to subsequently form a substantially continuous extensible structure 121, for instance, a non-woven sheet, as illustrated in FIG. 1B, or a yarn of twisted and intertwined nanotubes. Such a non-woven sheet may be generated from compacted, substantially non-aligned, and intermingled nanotubes 113, bundles of nanotubes, or intertwined nanotubes (e.g., ropes of nanotubes), with sufficient structural integrity to be handled as a sheet.

To collect the fabricated nanotubes 113, belt 120 may be positioned adjacent the exit end 114 of the synthesis chamber 11 to permit the nanotubes to be deposited on to belt 120. In one embodiment, belt 120 may be positioned substantially parallel to the flow of gas from the exit end 114, as illustrated in FIG. 1A. Alternatively, belt 120 may be positioned substantially perpendicular to the flow of gas from the exit end 114 and may be porous in nature to allow the flow of gas carrying the nanomaterials to pass therethrough. Belt 120 may be designed as a continuous loop, similar to a conventional conveyor belt. To that end, belt 120, in an embodiment, may be looped about opposing rotating elements 122 (e.g., rollers) and may be driven by a mechanical device, such as an electric motor. In one embodiment, the motor may be controlled through the use of a control system, such as a computer or microprocessor, so that tension and velocity can be optimized.

Although not shown, it should be appreciated that the nanotubes generated by system 10 may also be collected as a yarn, as provided below in Example II. Such an approach is disclosed in U.S. patent application Ser. No. 11/488,387, which is hereby incorporated herein by reference.

Stretching Procedure and Apparatus

Once the nanotubes 113 have been collected and the extensible structure 121 formed on belt 120, the extensible structure 121 may be removed from belt 120 for stretching.

Stretching, in accordance with one embodiment of the present invention, allows the intermingled and substantially non-aligned nanotubes, bundles of nanotubes, and/or ropes of nanotubes within the extensible structure to be pulled into substantial alignment. In addition, stretching may pull adjacent nanotubes into contact with one another, and can enhance points of contact between adjacent nanotubes, bundles of nanotubes, and/or ropes of nanotubes. The enhanced contact between adjacent nanotubes, in one embodiment, can lead to increased conductivity (e.g., electrical and thermal), as well as tensile strength of the extensible structure 121, in comparison to that of an extensible structure with substantially non-aligned nanotubes.

It should be appreciated that the extensible structure 121 may be stretched to permit nanotube alignment using any type of apparatus that produces a local stretching. The stretching, for example, may be done over a large amount of extensible structure material. However, the risk of the material elongating at a weak area or defect, in such an approach, can be higher than if the stretching apparatus were designed to stretch the material incrementally over a relatively smaller length (i.e. local stretching). In accordance with an embodiment of the present invention, systems 20 or 30, as illustrated in FIG. 2 and FIG. 3 respectively, may be used in connection with the stretching procedure incrementally over a relatively smaller distance.

In one embodiment, prior to stretching, the extensible structure 121 may be exposed to certain chemicals (e.g. mixture or solution) or to permit wetting of the structure, so that sufficient stretching can subsequently be carried out. To wet the extensible structure 121, the structure can, in an embodiment, be immersed in a liquid solution prior to mounting the structure on stretching system 20 or stretching system 30. Alternatively, the extensible structure 121 may be first mounted in the stretching system, then subsequently sprayed with the appropriate chemical mixture or solution until the structure can be sufficiently wetted. In accordance with one embodiment, it can be advantageous for the extensible structure 121 to remain substantially wet over a period of time, for example, from about a few minutes to more than a day, depending on the thickness of the extensible structure or the nature of the chemicals being used.

Once sufficiently wetted, the extensible structure 121 may be subject to elongation (i.e., stretching) in order to cause the intermingled and substantially non-aligned nanotubes 113 to substantially align along the direction of the stretching.

Figure 2:
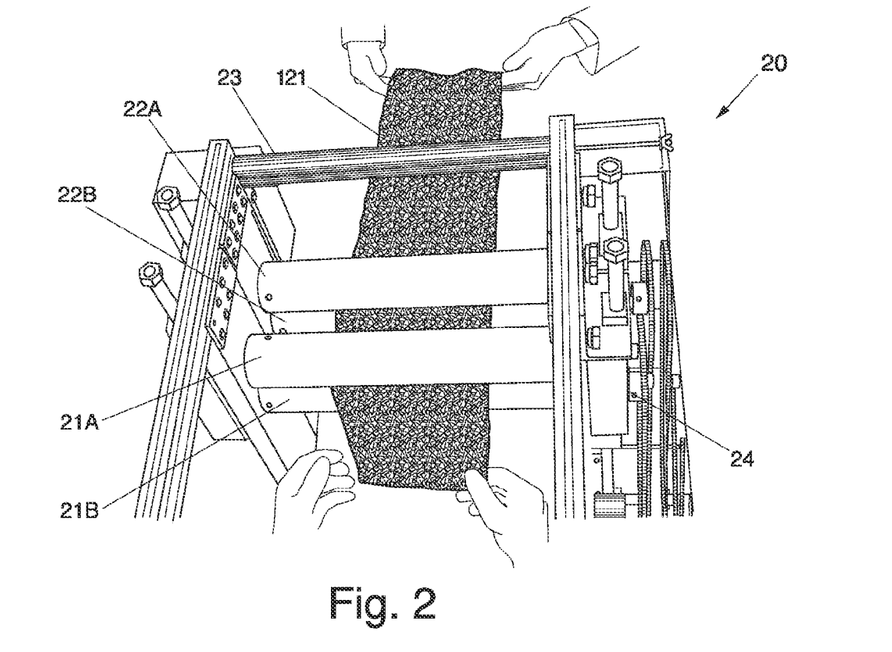
FIG. 2 illustrates a pinch roller stretching system for use in connection with one embodiment of the present invention.
Figure 3:
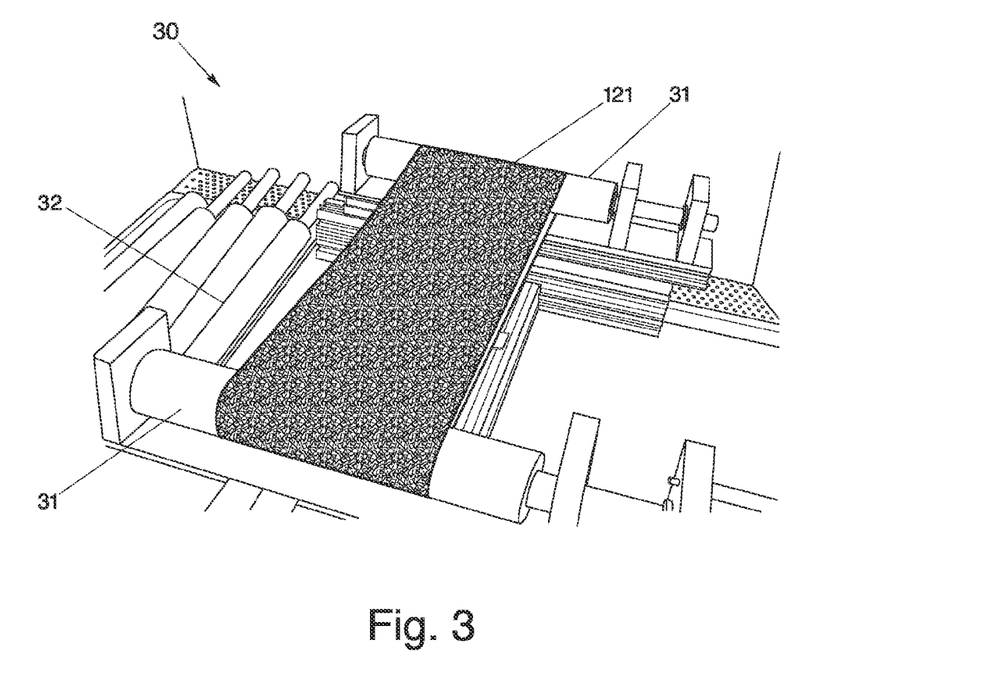
FIG. 3 illustrates another stretching system for use in stretching extensible non-woven sheets.

Looking now at FIG. 2, system 20 is provided for stretching extensible structure 121. System 20, in an embodiment, may include a first set of pinch rollers 21A, B and a second set of pinch rollers 22A, B positioned within framework 23. The design of pinch rollers 21A, B and pinch roller 22A, B, as illustrated, permits extensible structure 121 to be fed and pinch between each of pinch rollers 21A, B and pinch rollers 22 A, B. In addition, first set of pinch rollers 21A, B and second set of pinch rollers 22A, B may be designed be rotate at different velocities to permit stretching of the extensible structure 121. As an example, the differences in velocities between the two sets of pinch rollers may range from about 1 percent to about 30 percent, and in one embodiment, about 5 percent. In an embodiment, the differences in the rotating velocities of pinch rollers 21 may be controlled by the used of gears 24. Alternatively, stepper motors may be used to control the rotating velocities of the pinch rollers 21. Of course, any control mechanism known in the art may be used, so long as the rotating velocities may be sufficiently controlled.

With reference now to FIG. 3, system 30 is provided for stretching extensible structure 121. System 30, in an embodiment, may include opposing rollers 31, each capable of rotating about its axis. By providing opposing rollers 31, the extensible structure 121 can be positioned as a loop about the opposing rollers 31. Opposing rollers 31, in one embodiment, may be PTFE rollers, and may be mounted on a translating mechanism 32 to permit the rollers to move away from one another. The ability to rotate, while having one or both rollers 31 simultaneously translate (i.e., move away from the other) can permit the extensible structure 121 to be stretched, once the extensible structure 121 has been positioned about the opposing rollers 31. In one embodiment, the approximate distance at the start of the stretching between opposing rollers 31 may be at a predetermined distance, for instance, about 15 inches or any desired distance appropriate for the extensible structure 121 being stretched. The stretching time, on the other hand, may be conducted over about two hours or until about 30% elongation or more can be achieved. System 30 may also include a spray system (not shown) having a reservoir with the chemical mixture or solution for wetting the extensible structure 121. Such a spray system may also be provided for system 20, if so desired.

In general, the rate of elongation, when using either system 20 or system 30, can be from about 0.001 percent per minute to about 5 percent per minute. Sufficiently good results can be obtained with the rate of elongation being about 0.3 percent per minute.

In an embodiment whereupon a yarn may be stretched, such a yarn may be stretched to a point where its diameter (i.e., tex) can be reduced, so as to enable post spinning to increase tensile strength.

For extensible structures 121 that are either an non-woven sheet or a yarn, the amount of stretching can be from about 5 percent to several times the original length of the sheet or yarn.

It should be appreciated that although stretching can be done mechanically by the system 20 (FIG. 2) and/or system 30 (FIG. 3), stretching of the extensible structure 121 to permit substantial alignment of the nanotubes can also be accomplished by hand, by pressurized gas blowing on the extensible structure 121, by vacuum, or a combination thereof.

Figure 4:
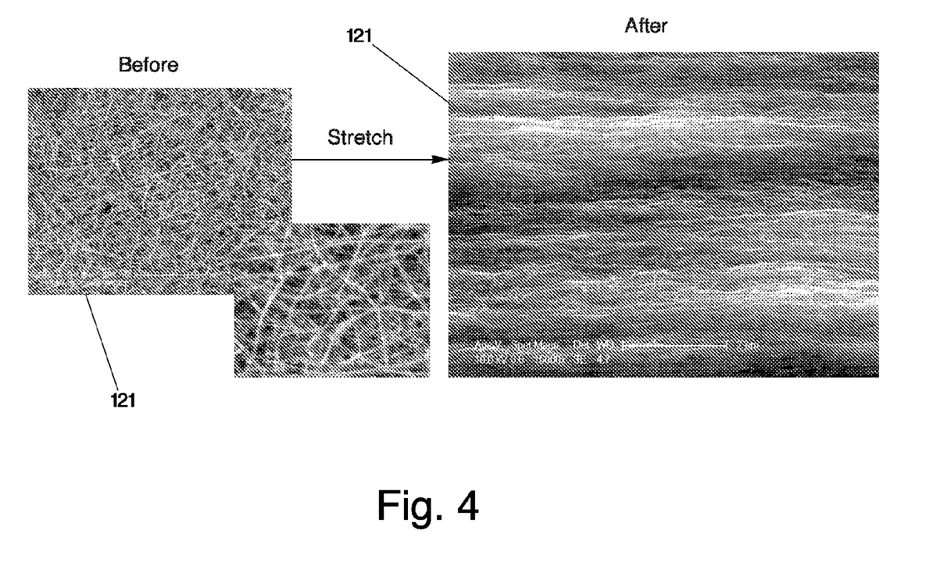
FIG. 4 is a scanning electron micrograph illustrating the relative position of the nanotubes in an extensible structure before and after stretching.

Upon sufficient stretching, substantial alignment of the nanotubes within extensible structure 121 can be achieved, as illustrated in FIG. 4. This alignment, in an embodiment, may be proportional to the degree of stretching, as evidenced and described below by the change in the resistivity with the degree of stretch, and with the increase in the mechanical properties with the degree of stretch. In addition, stretching may also enhance other properties of the extensible structure 121. Specifically, contacts between adjacent nanotubes, bundles of nanotubes, and/or ropes of nanotubes, can be enhanced, which can result in increased conductivity (e.g., electrical and thermal) as well as tensile strength of the extensible structure 121.

Chemical Treatment

In accordance with one embodiment of the present invention, wetting of the extensible structure 121 may be carried out at a temperature range of from about 20° C. to about 50° C. In a particular embodiment, the wetting of the structure 121 may be performed at a temperature of about 23° C.

The chemical mixture or solution used for wetting the extensible structure 121 in connection with the stretching procedure of the present invention can include, in an embodiment, a mixture of solvents and surfactants listed in Tables 1 and 2 below, in any various combination.

Solvents that can be used in connection with the present invention may be common chemistries for dispersion of carbon nanotubes (CNT')s. Moreover, tested solvents were chosen for their ability to wet CNT's, and as a carrier for surfactants (Table 1).

TABLE 1

Solvents used to dissolve surfactant and wet the surface of CNT's.

| Chemical | Formula | Structure |
|---|---|---|
| Aniline (Phenyl amine, Amino benzene) | $C_6H_7N$ |  |

TABLE 1-continued

Solvents used to dissolve surfactant and wet the surface of CNT's.

| Chemical | Formula | Structure |
|---|---|---|
| DMF (Dimethyl formamide) | $C_3H_7NO$ |  |
| NMP (N-methylpyrrolidone) | $C_5H_9NO$ |  |
| Toluene (methylbenzene) | $C_7H_8$ |  |
| Acetone (Dimethyl ketone) | $CH_3COCH_3$ |  |
| Dichlorobenzene | $C_6H_4Cl_2$ |  |

It should be noted that Aniline, DMF and NMP have reactive amide/amine functional groups that can form hydrogen or ionic bonds with open binding sites on the carbon nanotube surface. Depending on downstream processing goals, this bonding can be useful.

Surfactants that can be used in connection with the present invention, on the other hand, may include surfactants that can interact with the surface of carbon nanotubes by way of, for example, van der Waals forces. In particular, polar solvents used herewith can cause van der Waals interactions between the hydrophobic 'tails' of the surfactant molecules and the surface of the carbon nanotubes, so as to allow the charged 'head' of the surfactant molecule to orientate away from the surface of the carbon nanotubes, thus better solubilizing or wetting the carbon nanotubes in the solvent. Moreover, once the surfactant is on the surface of carbon nanotubes, it can prevent re-flocculation of the carbon nanotubes via, for example, steric and electrostatic effects.

It should be appreciated that since nanotubes are generally inert and hydrophobic, a substantially pristine surface may be ideal for interactions with the hydrophobic 'tail' of the surfactant. Furthermore, although binding sites on the surface of the carbon nanotubes can be utilized to functionalize the nanotubes, as discussed above, such binding sites may be blocked by the presence of the surfactant. This is not because the surfactant is taking the available bond, but because the size of the surfactant can act to block the solvent from binding sterically to the carbon nanotubes.

In one embodiment of the present invention, the concentration of the surfactant, such as ZetaSperse™, that may be used ranges from about 0.1 percent to about 5 percent by volume, and may preferably be about 1 percent by volume.

In another embodiment of the invention, large chain polymers can also be used as dispersants for carbon nanotubes. These polymers differ from surfactants in the way they keep the carbon nanotubes separated. In particular, the size of these polymers can enable these large polymer chains to sterically separate the nanotubes.

Surfactants and polymers suitable for this application are provided below in Table 2.

TABLE 2

Surfactants and polymers used as lubricants for chemically assisted mechanical elongation of CNT textile

| | |
|---|---|
| Anionic Surfactants | Sodium dodecyl sulfate (SDS) |
| | Sodium dodecylbenzenesulfonate (SDBS, NaDDBS) |
| | Sodium dodecylsulfonate (SDSA) |
| | Sodium sodium n-lauroylsarcosinate (Sarkosyl) |
| | Sodium alkyl allyl sulfosuccinate (TREM) |
| | Polystyrene sulfonate (PSS) |
| | Sodium cholate |
| Cationic Surfactants | Dodecyltrimethylammonium bromide (DTAB) |
| | Cetyltrimethylammonium bromide (CTAB) |
| Anionic/Cationic Surfactants | ZetaSperse ™ 2300 |
| Nonionic Surfactants | Brij Series |
| | Tween Series |
| | Triton X Series |
| | Poly(vinylpyrrolidone) (PVP) |
| | PEO-PBO-PEO triblock polymer (EBE) |
| | PEO-PPO-PEO triblock polymers (Pluronic ® Series |

The chemical mixture for use in connection with the wetting procedure of the present invention, thus, can include (i) a solvent, including, Aniline (Phenyl amine, Amino benzene), DMF (Dimethyl formamide), NMP (N-methylpyrrolidone), Toluene (methylbenzene), Acetone (Dimethyl ketone), or Dichlorobenzene, (ii) a surfactant, including an anionic surfactant, a cationic surfactant, an anionic/cationic surfactant, or a non-ionic surfactant, as provided above, in any combination, and may also include (iii) a dispersant, including any of the large chain polymers provided above.

Removing the Chemical

Following the elongation or stretching procedure, the extensible structure 121 may be washed in an appropriate solvent, such as acetone. Thereafter, the stretched structure may be air dried, then baked in a oven in air at temperatures that may be below about 400° C. The washing and drying procedure can be effective in removing chemicals used in the stretching process. The washing and drying procedure, when acetone is used, in one embodiment, can also further enhance contacts between adjacent nanotubes, so as to further increase conductivity (e.g., electrical and thermal) of the extensible structure 121.

Although acetone is disclosed, it should be appreciated that the step of washing may be accomplished using one of a thermal treatment, a chemical treatment, a electrochemical treatment, or a combination thereof.

EXAMPLE I

A single wall carbon nanotube non-woven sheet was produced by CVD deposition on a moving belt. This non-woven sheet (i.e., extensible structure) had dimensions of about 8 inches by about 36 inches, with an area density of about 1 mg/cm². The approximate volumetric density of this non-woven sheet was about 0.2 g/cm³. This non-woven sheet was mounted in system 30 of FIG. 3, and sprayed with a solution of DMF and ZetaSperse™. The solution of DMF and ZetaSperse™ was allowed to soak in for a period of about 10 minutes. The non-woven sheet was then stretched on system 30 at an elongation rate of about 1 inch/hr at a rotation rate of approximately 7 rpm.

Following the stretching, the non-woven sheet was soaked in acetone, allowed to air dry, and then baked in air at a temperature of 350° C. for about 3 hours.

Samples of this stretched non-woven sheet were taken from which property measurements were made. The results of the measurements are provided in Table 3.

TABLE 3

| Property | Before | After |
|---|---|---|
| Resistivity | $8 \times 10^{-4}$ Ω-cm | $2 \times 10^{-4}$ Ω-cm |
| Tensile Strength | 200 MPa | 800 MPa |
| Seebeck Coefficient | 6 μV/° K | 43 μV/° K |

EXAMPLE II

A partially spun yarn made of single wall carbon nanotubes was produced by a CVD process, similar to that described in U.S. patent application Ser. No. 11/488,387, incorporated herein by reference.

Figure 5:
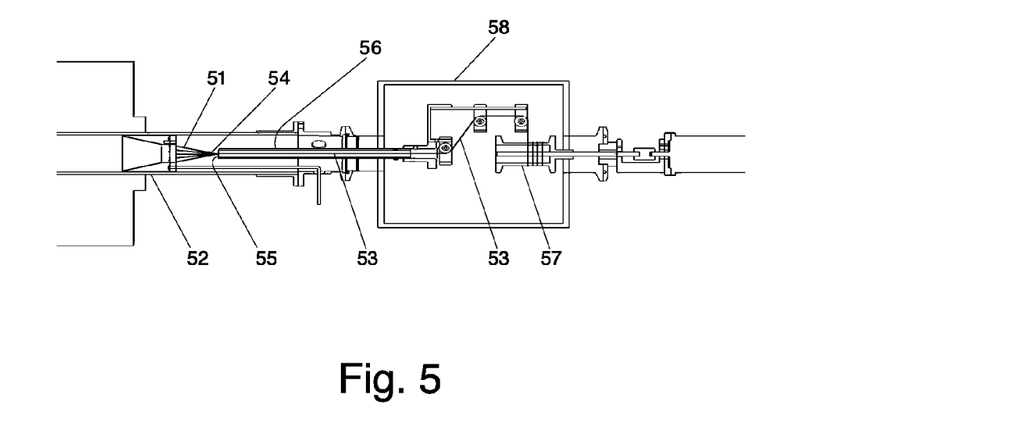
FIG. 5 illustrates a system for generating nanotubes and collecting the nanotubes as a yarn.

With reference now to FIG. 5, under steady-state production using a CVD process of the present invention, nanotubes 51 may be collected from within a synthesis chamber 52 and a yarn 53 may thereafter be formed. Specifically, as the nanotubes 51 emerge from the synthesis chamber 52, they may be collected into a bundle 54, fed into intake end 55 of a spindle 56, and subsequently spun or twisted into yarn 53 therewithin. It should be noted that a continual twist to the yarn 53 can build up sufficient angular stress to cause rotation near a point where new nanotubes 51 arrive at the spindle 56 to further the yarn formation process. Moreover, a continual tension may be applied to the yarn 53 or its advancement into collection chamber 58 may be permitted at a controlled rate, so as to allow its uptake circumferentially about a spool 57.

Typically, the formation of the yarn results from a bundling of nanotubes that may subsequently be tightly spun into a twisting yarn. Alternatively, a main twist of the yarn may be anchored at some point within system 10 and the collected nanotubes may be wound on to the twisting yarn. Both of these growth modes can be implemented in connection with the present invention.

The yarn generated can be immersed in an aniline solution, then stretched by hand by about 500 percent (i.e., 5 times its initial length). In an embodiment, the yarn can be soaked for a period of approximately 1 hour then stretched. A sample of the stretched material was taken for property measurements and these results are shown below in Table 4.

TABLE 4

| Property | Before | After |
|---|---|---|
| Resistivity | $3.0 \times 10^{-4}$ Ω-cm | $1.6 \times 10^{-4}$ Ω-cm |
| Tensile Strength | 1000 MPa | 1600 MPa |

It should be appreciated that the observed differences in properties between the extensible structure having substantially aligned nanotubes and increased contact points between adjacent nanotubes (After) and the extensible structure having substantially non-aligned nanotubes (Before) in both Example I (non-woven sheet) and Example II (yarn) are profound. For example, the tensile strength of the non-aligned nanotubes in the non-woven sheet changes from about 200 MPa to 800 MPa upon alignment, whereas the Seebeck coefficient changes from about 5 micro-Vs per degree K to about 50 micro-Vs per degree K. In addition, the resistivity, and thus conductivity, changes from about $8 \times 10^{-4}$ Ω-cm to about $2 \times 10^{-4}$ Ω-cm.

As for the yarn, although the nanotubes in the yarn are more aligned than the non-woven sheet at the start, an improvement in tensile strength, from about 1000 MPa to about 1600 MPa, and resistivity, from about $3.0 \times 10^{-4}$ Ω-cm to about $1.6 \times 10^{-4}$ Ω-cm were also observed upon alignment of the nanotubes.

While the present invention has been described with reference to certain embodiments thereof, it should be understood by those skilled in the art that various changes may be made and equivalents may be substituted without departing from the true spirit and scope of the invention. In addition, many modifications may be made to adapt to a particular situation, indication, material and composition of matter, process step or steps, without departing from the spirit and scope of the present invention. All such modifications are intended to be within the scope of the claims appended hereto.

What is claimed is:

1. A method for aligning nanotubes within a nanofibrous structure, the method comprising:
   providing a nanofibrous structure having sufficient structural integrity for subsequent handling during alignment of nanotube, the structure being defined by a plurality of substantially non-aligned nanotubes;
   exposing the nanotubes within the nanofibrous structure to a solution having a solvent and a surfactant so that the surfactant can interact with surfaces of the nanotubes to promote separation of the nanotubes within the nanofibrous structure; and
   stretching the nanofibrous structure, so as to substantially align the nanotubes relative to one another within the stretched nanofibrous structure.

2. A method as set forth in claim 1, wherein, in the step of providing, the nanofibrous structure is a non-woven sheet of non-aligned nanotubes.

3. A method as set forth in claim 1, wherein, in the step of providing, the nanofibrous structure is a yarn comprising a plurality of twisted nanotubes.

4. A method as set forth in claim 1, wherein, in the step of providing, the nanotubes include one of carbon nanotubes, boron nanotubes, or a combination thereof.

5. A method as set forth in claim 1, wherein, in the step of providing, the nanotubes include one of single wall nanotubes, multiwall nanotubes, or a combination thereof.

6. A method as set forth in claim 1, wherein, in the step of exposing, the solvent includes one of Aniline (Phenyl amine, Amino benzene), DMF (Dimethyl formamide), NMP (N-methylpyrrolidone), Toluene (methylbenzene), Acetone (Dimethyl ketone), or Dichlorobenzene.

7. A method as set forth in claim 1, wherein, in the step of exposing the surfactant includes one of an anionic surfactant, a cationic surfactant, an anionic/cationic surfactant, or a non-ionic surfactant.

8. A method as set forth in claim 1, wherein, in the step of exposing , the solution includes (i) a solvent, including, Aniline (Phenyl amine, Amino benzene), DMF (Dimethyl formamide), NMP (N-methylpyrrolidone), Toluene (methylbenzene), Acetone (Dimethyl ketone), or Dichlorobenzene, and (ii) a surfactant, including an anionic surfactant, a cationic surfactant, an anionic/cationic surfactant, or a non-ionic surfactant, in any combination thereof.

9. A method as set forth in claim 1, wherein, in the step of exposing, the solution includes aniline in combination with a surfactant, wherein the surfactant is one of Sodium dodecyl sulfate (SDS), Sodium dodecylbenzenesulfonate (SDBS, NaDDBS), Sodium dodecylsulfonate (SDSA), Sodium sodium n-lauroylsarcosinate (Sarkosyl), Sodium alkyl allyl sulfosuccinate (TREM), Polystyrene sulfonate (PSS), Sodium cholate, Dodecyltrimethylammonium bromide (DTAB), Cetyltrimethylammonium bromide (CTAB), Poly (vinylpyrrolidone) (PVP), PEO-PBO-PEO triblock polymer (EBE), PEO-PPO-PEO triblock polymers (Pluronic® Series), or a combination thereof.

10. A method as set forth in claim 1, wherein, in the step of exposing, the solution includes DMF in combination with a surfactant, wherein the surfactant is one of Sodium dodecyl sulfate (SDS), Sodium dodecylbenzenesulfonate (SDBS, NaDDBS), Sodium dodecylsulfonate (SDSA), Sodium sodium n-lauroylsarcosinate (Sarkosyl), Sodium alkyl allyl sulfosuccinate (TREM), Polystyrene sulfonate (PSS), Sodium cholate, Dodecyltrimethylammonium bromide (DTAB), Cetyltrimethylammonium bromide (CTAB), Poly (vinylpyrrolidone) (PVP), PEO-PBO-PEO triblock polymer (EBE), PEO-PPO-PEO triblock polymers (Pluronic® Series), or a combination thereof.

11. A method as set forth in claim 1, wherein, in the step of exposing, the solution includes neat DMF in combination with SDS.

12. A method as set forth in claim 1, wherein, in the step of exposing, the solution includes acetone in combination with a surfactant, wherein the surfactant is one of Sodium dodecyl sulfate (SDS), Sodium dodecylbenzenesulfonate (SDBS, NaDDBS), Sodium dodecylsulfonate (SDSA), Sodium sodium n-lauroylsarcosinate (Sarkosyl), Sodium alkyl allyl sulfosuccinate (TREM), Polystyrene sulfonate (PSS), Sodium cholate, Dodecyltrimethylammonium bromide (DTAB), Cetyltrimethylammonium bromide (CTAB), Poly (vinylpyrrolidone) (PVP), PEO-PBO-PEO triblock polymer (EBE), PEO-PPO-PEO triblock polymers (Pluronic® Series), or a combination thereof.

13. A method as set forth in claim 1, wherein, in the step of exposing, the solution includes neat acetone in combination with SDS.

14. A method as set forth in claim 1, wherein, in the step of exposing, the solution includes o-Dichlorobenzene in combination with a surfactant, wherein the surfactant is one of Sodium dodecyl sulfate (SDS), Sodium dodecylbenzenesulfonate (SDBS, NaDDBS), Sodium dodecylsulfonate (SDSA), Sodium sodium n-lauroylsarcosinate (Sarkosyl), Sodium alkyl allyl sulfosuccinate (TREM), Polystyrene sulfonate (PSS), Sodium cholate, Dodecyltrimethylammonium bromide (DTAB), Cetyltrimethylammonium bromide (CTAB), Poly(vinylpyrrolidone) (PVP), PEO-PBO-PEO triblock polymer (EBE), PEO-PPO-PEO triblock polymers (Pluronic® Series), or a combination thereof.

15. A method as set forth in claim 1, wherein the step of exposing includes performing wetting of the nanotubes at the temperature range from about 20 degrees centigrade to about 50 degrees centigrade.

16. A method as set forth in claim 1, wherein the step of exposing includes performing wetting of the nanotubes at the temperature of about 23 degrees centigrade.

17. A method as set forth in claim 1, wherein the step of stretching is done in a mechanical apparatus.

18. A method as set forth in claim 1, wherein the step of stretching is done by one of by hand, by pressurized gas blowing on the nanofibrous structure, by vacuum, or a combination thereof.

19. A method as set forth in claim 1, further including washing the stretched nanofibrous structure in a solvent to remove any residue.

20. A method as set forth in claim 19, wherein the step of washing includes one of a thermal treatment, a chemical treatment, an electrochemical treatment, or a combination thereof.

21. A method as set forth in claim 19, further including exposing the washed nanofibrous structure to a temperature less than about 400° C.

* * * * *